United States Patent [19]

Cuiper

[11] Patent Number: 4,699,215
[45] Date of Patent: Oct. 13, 1987

[54] EXTERNAL TIE-BACK CONNECTOR

[75] Inventor: Glen H. Cuiper, Spring, Tex.

[73] Assignee: Hughes Tool Company, Houston, Tex.

[21] Appl. No.: 897,567

[22] Filed: Aug. 18, 1986

[51] Int. Cl.[4] .................. E21B 7/12; E21B 33/043
[52] U.S. Cl. .................................. 166/341; 166/359; 285/317
[58] Field of Search .............. 166/338, 341, 342, 344, 166/345, 359, 360, 367; 285/18, 317

[56] References Cited

U.S. PATENT DOCUMENTS

| | | | |
|---|---|---|---|
| 3,228,715 | 1/1966 | Neilson et al. | 285/317 |
| 3,321,217 | 5/1967 | Ahlstone | 166/338 |
| 3,334,924 | 8/1967 | Todd | 166/348 |
| 3,521,909 | 7/1970 | Brown | 285/3 |
| 3,543,847 | 12/1970 | Haeber | 166/360 |
| 4,093,030 | 6/1978 | Bonds | 166/208 |
| 4,433,859 | 2/1984 | Driver et al. | 285/317 |

Primary Examiner—Stephen J. Novosad
Assistant Examiner—Terry Lee Melius
Attorney, Agent, or Firm—James E. Bradley

[57] ABSTRACT

An apparatus for connecting a riser to a wellhead housing for a tie-back connection allows connection without rotation or hydraulic actuation. A connector body is mounted to the lower end of the riser for lowering over the wellhead housing. Dogs are carried in the connector body, each having grooves on its interior for mating with grooves formed on the wellhead housing. Guide surfaces in the connector body allow the dogs to retract and extend, but only in directions perpendicular to the upper flanks of the wellhead housing grooves. Springs urge the dogs inwardly and downwardly to lock the connector body to the wellhead housing. A release mechanism allows the connector body to be pulled upwardly and removed from the wellhead housing.

8 Claims, 9 Drawing Figures

EXTERNAL TIE-BACK CONNECTOR

CROSS-REFERENCE TO RELATED APPLICATION

This application is being filed simultaneously with an application by the same inventor which contains some common subject matter and is entitled INTERNAL NONROTATING TIE-BACK CONNECTOR.

BACKGROUND OF THE INVENTION

1. Field of the Invention:

This invention relates in general to subsea well completion equipment, and particular to a tie-back connection apparatus for a subsea well.

2. Description of the Prior Art:

One method of completing a subsea well is to place the Christmas Tree on the subsea floor. Valves and controls will be associated with a Christmas Tree for controlling the flow of oil. The oil may flow through a production riser extending to a production platform at the surface.

A subsea Christmas Tree and its controls will be considerably more expensive than a Christmas Tree located above the surface of the water. Because of this, tie-back connections are sometimes used. With a tie-back connection, conduit is extended from the wellhead housing at the subsea floor to the surface. The Christmas Tree will be mounted at the top of the conduit at the surface. The conduit will be supported in tension by a floating production vessel.

One difficulty with existing tie-back connections is in stabbing the production riser over the wellhead housing. Typically, wellhead connectors have hydraulically actuated dogs which engage circumferential grooves formed on the exterior of the wellhead connector. This requires a hydraulic system to actuate and disengage the wellhead connector.

SUMMARY OF THE INVENTION

In this invention, the connector body connects to the wellhead with a plurality of dogs. Each of the dogs has a groove on its interior for mating with the grooves on the wellhead. The connector body has guide means in it which allows the dogs to retract outward and upward in directions perpendicular to the upper flank of each groove of the wellhead housing. The guide means also allows the dogs to extend inward in directions perpendicular to the upper flank of each groove of the wellhead housing. Springs located between the dogs and connector body urge the dogs into the extended position.

The upward and outward movement of the dogs as they contact the grooves causes the dogs to rachet past and lock into the grooves without the need for hydraulics. A release mechanism, when actuated, allows the connector body to be pulled upwardly relative to the dogs, allowing them to retract.

An indicator protrudes from the exterior of the connector body to inform a diver whether or not the dogs have moved into the extended engaged position. The indicator is mounted in a threaded rod, which can be rotated to physically push the dogs in place if they fail to properly engage.

DESCRIPTION OF THE PREFERRED EMBODIMENT

Figure 2:
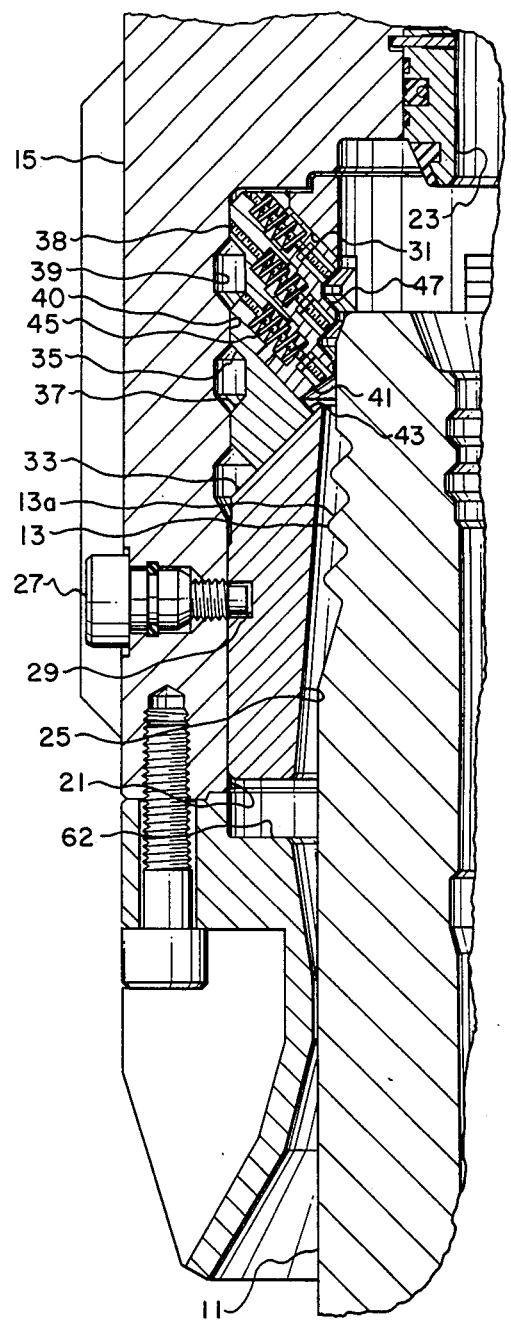
FIG. 2 is an enlarged view of the apparatus of FIG. 1, shown prior to engaging the wellhead housing.

Referring to FIG. 2, wellhead housing 11 is of a conventional type, having a plurality of grooves 13 formed on its exterior near its upper end. Grooves 13 are vertically spaced apart and parallel with each other. Each groove 13 has an upper flank 13a that faces upwardly and outwardly at a selected angle, such as about 45 degrees. The wellhead housing 11 will be supported on the sea floor, and is adapted to receive in its interior casing and tubing hangers (not shown).

Figure 1:
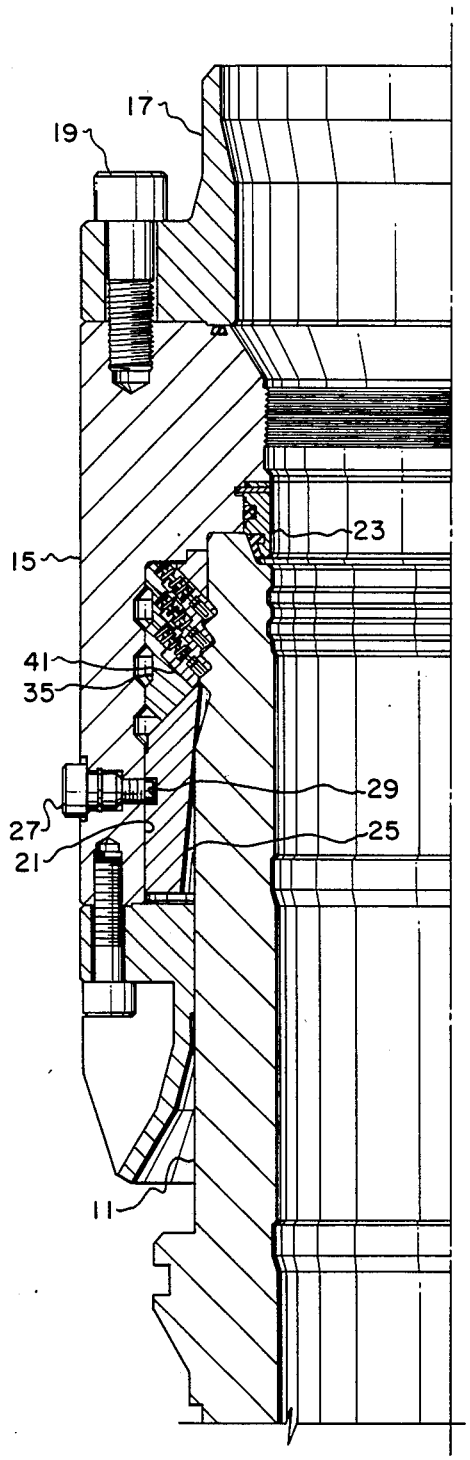
FIG. 1 is a partial sectional view of an apparatus for making a tie-back connection of a riser to a wellhead housing.

Referring to FIG. 1, the wellhead housing 11 is adapted to be connected to the surface through a connector body 15 which is bolted to a string of riser conduit 17 by bolts 19. The riser 17 extends to the surface and is held in tension by a floating vessel (not shown). The connector body 15 is a cylindrical or annular member having a bore 21 which fits over the wellhead housing 11. A seal 23 is carried by the connector body 15 and serves to seal the connector body 15 to the wellhead housing 11.

A slide housing 25 is carried in the connector body 21. Slide housing 25 is an annular cylindrical member. The connector body 15 can move relative to the slide housing 25 between a lower engaged position shown in FIGS. 1–3, and a released position shown in FIG. 4. A locking pin 27 extends through the wellhead housing 11 to engage a groove 29 in the slide housing 25. Unscrewing the locking pin 27 removes it from the groove 29, and alows the connector body 15 to be pulled upwardly to the released position shown in FIG. 4.

Referring to FIG. 2, slide housing 25 has a plurality of apertures 31 spaced around its exterior. Each aperture 31 is rectangular and evenly spaced from the other apertures 31. The lower edge of each aperture comprises a reaction shoulder 33. The reaction shoulder 33 is an inclined surface that is substantially parallel with the upper flanks 13a of the grooves 13 when the connector body 15 is installed in the wellhead housing 11. The reaction shoulder 33 faces upwardly and outwardly at the same angle as the upper flanks 13a relative to the vertical axis of the wellhead housing 11.

A backup segment 35 is carried in each aperture 31. Each backup segment 35 is a segment of a cylinder that is sized to fit closely within one of the apertures 31. The lower edge of each backup segment 35 is formed at the same angle as the reaction shoulder 33 for sliding on the reaction shoulder 33. On the exterior of the backup segment 35, two large grooves 37 are formed. Grooves 37 are separated from each other by shoulders 38.

The connector body 15 has in its bore 21 a plurality of grooves 39. The grooves 39 extend circumferentially around the bore 21 and are sized to mate with the grooves 37 of each backup segment 35. Each groove 39 is separated by an annular shoulder 40.

Figures 3, 4:
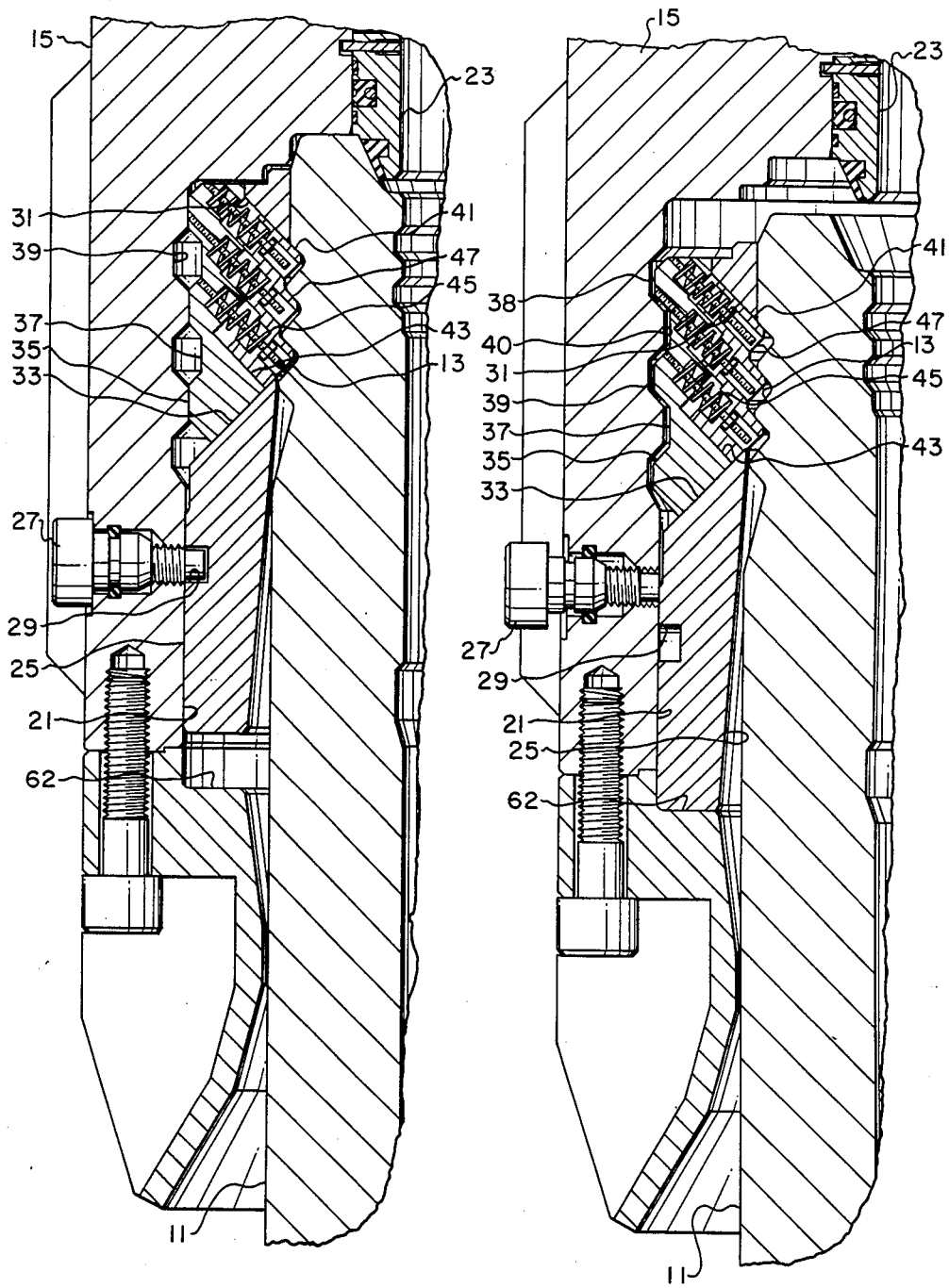
FIG. 3 is an enlarged view of the apparatus of FIG. 1, shown in the engaged position.
FIG. 4 is is an enlarged view of the apparatus of FIG. 1, shown in a released position.

When the connector body 15 is in the lower engaged position relative to the slide housing 25, as shown in FIG. 2, the shoulders 38 and 40 will be in contact with each other. The grooves 37 and 39 will be spaced across from each other at the same vertical level. This position keeps the backup segments 35 in the inner position. Referring to FIG. 4, if the locking pin 27 is unscrewed, and the connector body 15 pulled upwardly relative to slide housing 25, then the backup segment 35 can slide outwardly from the reaction shoulder 33 so that each shoulder 38 locates inside the grooves 39. Correspondingly, the connector body shoulders 40 will be located inside each backup segment groove 37.

Figure 9:
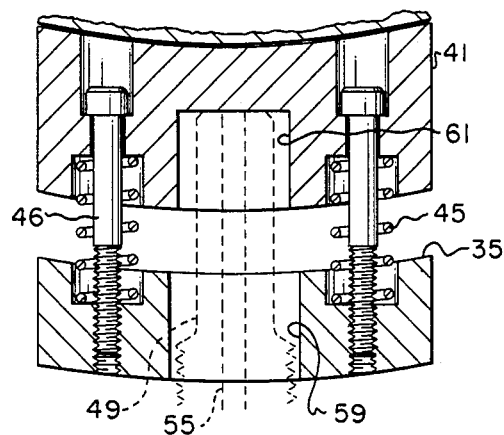
FIG. 9 is a partial sectional view of the apparatus of FIG. 1, taken along the line IX—IX of FIG. 8.

Referring again to FIG. 2, a dog 41 is located also in each aperture 31, inwardly of each backup segment 35. Each dog 41 is a segment of a cylinder, as shown in FIG. 9, and is sized to closely fit on the interior side of each backup segment 35. Each backup segment 35 has a guide surface 43 on its interior that inclines downwardly and inwardly perpendicular to the reaction shoulder 33. When the connector body 15 is installed, as shown in FIG. 3, the guide surface 43 will be perpendicular to the flanks 13a of the wellhead houseing grooves 13. The dogs 41 can move relative to their backup segments 35 between an inner engaged position, shown in FIG. 3 and a retracted outer position, shown in FIG. 4. The guide surface 43 forces the dogs 41 to move only in directions perpendicular to the upper flanks 13a of the grooves 13.

Springs 45, shown also in FIG. 9, urge the dogs 41 to the inner engaged position. Each dog 41 is retained with a backup segment 35 by means of bolts 46, as shown in FIG. 9. Bolts 46 allow the dogs 41 to retract and extend relative to the backup segment 37. Each dog 41 has a plurality of grooves 47 that are formed to mate with the wellhead housing grooves 11.

FIG. 5-9 illustrates an indicator means for indicating whether or not the dogs 41 are in the fully engaged position, and also for forcing them into the engaged position if not. This includes a threaded rod 49. Threaded rod 49 is screwed into the wellhead housing 11. There is a threaded rod 49 for each dog 41. The threaded rod 41 has a knob 51 that is located on the exterior of the connector body 15. When the rod 49 is in its outer position, shown in FIG. 5, the knob 51 will be spaced above a recess shoulder 53 formed in connector body 15. If the knob 51 is rotated to move the rod 49 to the inner position, shown in FIG. 8, the knob 51 will contact the recess shoulder 53.

A plunger 55 extends reciprocally through the rod 49. Plunger 55 is urged inwardly toward the wellhead housing 11 by means of a spring 57. There is a slot 61 (FIG. 9) through each backup segment 35, enabling the plunger 55 to extend through and contact the back of the dog 41. The slot 59 also enables a forward end of the threaded rod 49 to extend through the backup segment 35. There is also a vertical slot 61 in each of the dogs 41. Slot 61 enables the connector body 15 to be pulled upwardly when in the released position, without the plunger 55 and rod 49 interfering with the dog 41, even if the rod 49 is in the inner position.

In operation, the riser 17 (FIG. 1) is lowered into the sea over the wellhead housing 11. Referring to FIGS. 2 and 3, as the connector body 15 lowers over the wellhead housing 11, the grooves 47 of the dogs 41 will contact the wellhead housing grooves 13. This causes the dogs 41 to retract. The retraction is upwardly and outwardly perpendicular to the upper flanks 13a of the grooves 13, due to the guide means or guide surface 43. When the connector body 15 has fully seated on the wellhead housing 11, as shown in Figure 3, the dogs 41 will be urged to the inner extended or engaged position by the springs 45. This locks the connector body 15 to the wellhead housing 11. The dogs 41 will prevent the connector body 15 from moving upward relative to the wellhed housing 11 under upward tension. Because the guide surface 43 allows the dogs 41 to retract only by moving upwardly and outwardly, the dogs will not retract due to upward tension.

Figures 5, 6:
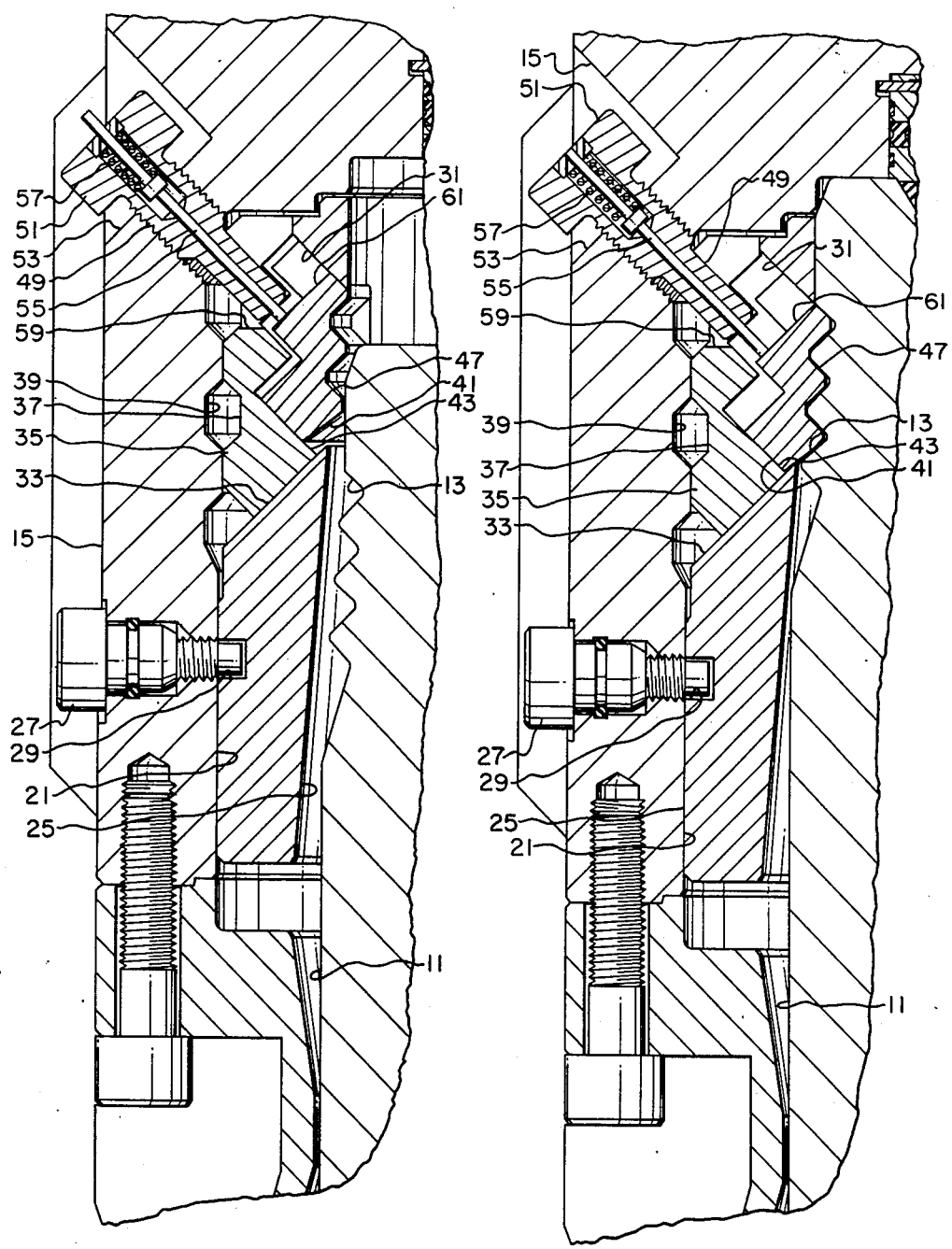
FIG. 5 is an enlarged sectional view of the apparatus of FIG. 1, taken along a different sectional plane, and shown prior to being secured in the locked and engaged position.
FIG. 6 is a view of the apparatus as shown in FIG. 5, but shown in the engaged position.

Referring to FIGS. 5-9, while the connector body 15 is being lowered, the plunger 55 will be in contact with the back of the dog 41. The plunger 55 is sized so that when the dog 41 is retracted back, as shown in FIG. 5, the upper end of the plunger 55 will protrude beyond the knob 51. Once the dog 41 has moved to the extended position into engagement with the grooves 13, as shown in FIG. 6, the plunger spring 57 will have pushed the plunger 55 further downward and inward. In this position, as shown in FIG. 6, the outer end of the plunger 55 is flush with the threaded rod 49. A diver can inspect the connector body 15 and determine visibly whether or not all of the plungers 55 are flush with the knobs 51.

Figures 7, 8:
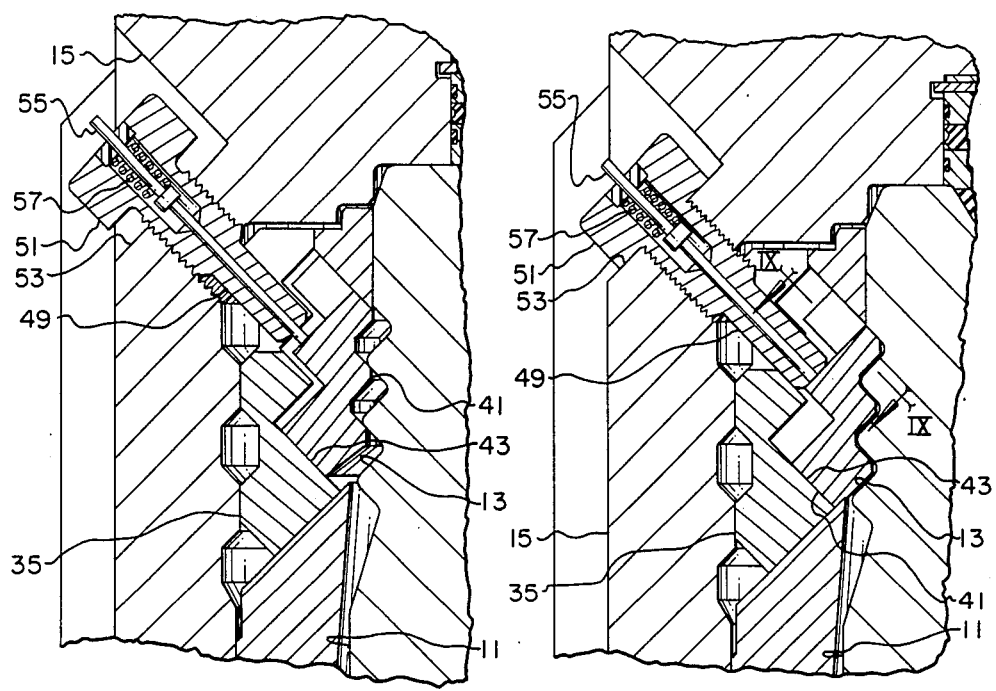
FIG. 7 is a view of the apparatus similar to FIG. 6, but shown in a position wherein the dog has failed to fully engage the grooves.
FIG. 8 is a view similar to FIG. 7, showing the dog forceably urged into the engaged position.

It may be that one or more of the dogs 41 do not fully engage the grooves 13, as shown in FIG. 7. If this occurs, the plunger 55 will still be protruding some distance beyond the upper end of the knob 51. The diver, upon seeing this condition, then rotates the knob 51. This causes the lower end of the threaded rod 49 to push against the dog 41, forcing it into engagement with the grooves 13. When the knob 51 contacts the recess shoulder 53, the dog 41 will be in full engagement with the grooves 13. It is not necessary for the diver to then rotate the knob 51 in reverse, back to the position shown in FIGS. 5, 6 and 7.

Normally, connector body 15 will be connected to well housing 11 for a long duration, perhaps several years. It may be at one time that it will be necessary to release the connector body 15 and pull it upwardly from the wellhead housing 11. To do this, a diver proceeds to the connector body 15 and rotates the locking pin 27 to retract it from the groove 29. Then, at the surface, the vessel will lift the riser 17. The connector body 15 is free to move upwardly relative to the slide housing 25, the backup segments 35 and the dogs 41. As shown in FIG. 4, after a certain distance, an internal shoulder 62 located on the lower end of the connector body 15 will contact the slide housing 25. Also, at the same time, the connector body internal shoulders 40 will align with the backup segment grooves 37, allowing the backup segments 35 to move outwardly. The shoulders 38 of the backup segments 35 will enter the grooves 39 of the connector body 15. The inclined reaction shoulder 33 pushes outwardly and upwardly against the backup segments 35 and the dogs 41, causing the dogs 41 to retract from the grooves 13.

When fully retracted, further upward pulling from the riser 17 will allow the entire connector body 15, including the slide housing 25 to be removed. The slots 59 and 61, shown in FIGS. 5–9, enable the threaded rod 49 and plunger 55 to be pulled straight upward relative to the backup segments 35 and dogs 41, when the connector body 15 is moving upwardly relative to the slide housing 25. The slots 59 and 61 allow removal of the connector body 15 from the wellhead housing 11 without unscrewing any of the threaded rods 49.

The invention has significant advantages. The riser is connected to the wellhead without the need for any hydraulic action at the connector body. The dogs positively lock the connector body to the wellhead, allowing the riser to be placed in tension for a tie-back connection. The threaded rods provide information to a diver as to whether or not the dogs have fully engaged the wellhead housing grooves. The indicator devices also allow the diver to force the dogs into the grooves should the dogs not be in fully engagement. The release system allows easy removal of the connector from the wellhead housing.

While the invention has been shown in only one of its forms, it should be apparent to those skilled in the art that it is not so limited, but is susceptible to various changes without departing from the scope of the invention.

I claim:

1. An apparatus for connecting a riser lowered from the surface to a wellhead housing of the type having a plurality of parallel grooves on its exterior, each groove having an upper flank that faces upward and outward relative to the axis of the wellhead housing, the apparatus comprising in combination:

a connector body adapted to be connected to the riser and lowered over the wellhead housing;

a plurality of dogs carried in the connector body, each having grooves on its interior for mating with the grooves on the wellhead housing;

spring means for urging the dogs inward relative to the connector body;

guide means in the connector body for allowing the dogs to retract outward and upward and extend inward and downward relative to the connector body only in directions substantially perpendicular to the upper flanks of the wellhead housing grooves, the spring means causing the dogs to slidingly engage the grooves of the wellhead housing as the connector body is lowered over the wellhead housing until the grooves of the dogs align with the grooves of the wellhead housing and the connector body is seated on the wellhead housing, the spring means then urging the dogs inward into locking engagement with the grooves of the wellhead housing;

the guide means preventing the dogs from moving outward from the grooves of the wellhead housing during the application of an upward force on the connector body;

release means carried in the connector body for applying an outwardly directed force to the dogs, forcing the dogs outward from the wellhead grooves when the connector body is pulled upward; and locking means for selectively preventing the release means from operating.

2. An apparatus for connecting a riser lowered from the surface to a wellhead housing of the type having a plurality of parallel grooves on its exterior, each groove having an upper flank that faces upwardly and outwardly relative to the axis of the wellhead housing, the apparatus comprising in combination:

a connector body adapted to be connected to the riser and lowered over the wellhead housing;

a plurality of backup segments carried in the connector body for movement between inner and outer positions, each backup segment having a recess on its inner side;

a dog carried by each backup segment in the recess, each dog having a plurality of grooves on its inner side for mating with the grooves on the wellhead housing, and movable from a retracted position into an extended position relative to each backup segment;

each recess of each backup segment having inclined upper and lower shoulders for allowing the dogs to move relative to the backup segment only in directions substantially perpendicular to the upper flanks of the wellhead housing grooves when the connector body is located on the wellhead housing;

means for moving the dogs to the extended position to lock the connector body to the wellhead housing when the grooves of the dogs are aligned with the grooves of the wellhead housing;

the inclined shoulders of the recess preventing the dogs from moving outward from the grooves of the wellhead housing during the application of an upwardly directed force on the connector body; and means for maintaining the backup segments in the inner position while lowering the connector body onto the wellhead and while the connector body is locked to the wellhead, and when the connector body is moved upwardly relative to the backup segments for releasing the connector body, for moving the backup segments to the outer position to disengage the dogs from the grooves and release the connector body from the wellhead housing.

3. An apparatus for connecting riser lowered from the surface to a wellhead housing of the type having a plurality of parallel grooves on its exterior, each groove having an upper flank that faces upwardly and outwardly relative to the axis of the wellhead housing, the apparatus comprising in combination:

a connector body adapted to be connected to the riser and lowered over the wellhead housing;

a slide housing carried in the connector body, the connector body being movable upwardly relative to the slide housing from an engaged position to a released position;

locking means for selectively preventing relative movement of the connector body to the slide housing;

a plurality of apertures formed in the slide housing, each having a reaction shoulder formed on the lower side that faces upward and outward relative to the axis of the connector body;

a backup segment carried in each aperture of the slide housing for movement between an inner engaged position and an outer released position;

a dog carried by each backup segment on the inner side of each backup segment, each dog having a plurality of grooves on its inner side for mating with the grooves on the wellhead;

spring means located between each dog and backup segment for urging the dogs to extend inward relative to the connector body;

guide means on each backup segment for allowing the dogs to retract outward and upward relative to the backup segment in directions substantially perpendicular to the upper flanks of the wellhead housing grooves, the spring means causing the dogs to slidingly engage the grooves on the wellhead housing as the connector body is lowered over the wellhead housing until the grooves of the dogs align with the grooves of the wellhead housing and the connector body is seated on the wellhead housing;

the guide means preventing the dogs from moving outward from the grooves of the wellhead housing during the application of an upward force on the connector body;

means formed on the outer side of the backup segments and the interior of the connector body for maintaining the backup segments in the inner position while lowering the connector body over the wellhead housing and while the connector body is locked to the wellhead, and when the locking means is released and the connector body pulled upwardly relative to the slide housing, for allowing the backup segments to move to the outer position, the reaction shoulders forcing the dogs outward to disengage from the grooves of the wellhead housing to release the connector body from the wellhead housing.

4. An apparatus for connecting a riser lowered from the surface to a wellhead housing of the type having a plurality of parallel grooves on its exterior, each groove having an upper flank that faces upwardly and outwardly relative to the axis of the wellhead housing, the apparatus comprising in combination:

a connector body adapted to be connected to the riser and lowered over the wellhead housing;

a slide housing carried in the connector body, the connector body being movable upwardly relative to the slide housing from an engaged position to a released position;

locking means for selectively preventing relative movement of the connector body to the slide housing;

a plurality of apertures formed in the slide housing, each having a reaction shoulder formed on the lower side that faces upward and outward relative to the axis of the connector body;

a backup segment carried in each aperture of the slide housing for movement between an inner engaged position and an outer released position relative to the slide housing, each backup segment having at least one shoulder on its exterior;

a dog carried by each backup segment on the inner side of each backup segment, each dog having a plurality of grooves on its inner side for mating with the grooves on the wellhead;

spring means located between each dog and backup segment for urging the dogs to extend inward relative to the connector body;

guide means on each backup segment for allowing the dogs to retract outward and upward relative to the backup segment in directions substantially perpendicular to the upper flanks of the wellhead housing grooves, the spring means causing the dogs to slidingly engage the grooves on the wellhead housing as the connector body is lowered over the wellhead housing until the grooves of the dogs align with the grooves of the wellhead housing and the connector body is seated on the wellhead housing;

the connector body having on its interior at least one annular shoulder that aligns with the shoulders on the backup segments while the connector body is in the engaged position relative to the slide housing to prevent the backup segments from outward movement; and the shoulders of the backup segments and connector body misaligning when the connector body is moved to the released position relative to the slide housing, allowing the backup segments to retract, the reaction shoulders thereupon forcing the dogs outward to disengage from the grooves to release the wellhead housing.

5. An apparatus for connecting a riser lowered from the surface to a wellhead housing of the type having a plurality of parallel grooves on its exterior, each groove having an upper flank that faces upwardly and outwardly relative to the axis of the wellhead housing, the apparatus comprising in combination:

a connector body adapted to be connected to the riser and lowered over the wellhead housing;

a plurality of dogs carried in the connector body, each having grooves on an inner side for mating with the grooves on the wellhead housing, each being movable from a retracted position to an extended position relative to the connector body;

the dogs being carried by the connector body so that they will move from the retracted to the extended position only in directions substantially perpendicular to the upper flanks of the wellhead housing grooves when the connector body is located on the wellhead housing;

means for moving the dogs to the extended position to lock the connector body to the wellhead housing when the grooves of the dogs are aligned with the grooves of the wellhead housing; and indicator means having an inner end in contact with an outer side of each of the dogs and an outer end protruding the exterior of the connector body for indicating whether or not the dogs are extended inwardly into full engagement with the wellhead housing grooves.

6. An apparatus for connecting a riser lowered from the surface to a wellhead housing of the type having a plurality of parallel grooves on its exterior, each groove having an upper flank that faces upwardly and outwardly relative to the axis of the wellhead housing, the apparatus comprising in combination:

a connector body adapted to be connected to the riser and lowered over the wellhead housing;

a plurality of dogs carried in the connector body, each having grooves on an inner side for mating with the grooves on the wellhead housing;

spring means for urging the dogs to extend inward relative to the connector body;

guide means in the connector body for allowing the dogs to retract outward and upward and extend inward and downward relative to the connector body in directions perpendicular to the upper flanks of the wellhead housing grooves, the spring means causing the dogs to contact and slide on the grooves on the wellhead housing as the connector body is lowered over the wellhead housing until the grooves of the dogs align with the grooves of the wellhead housing and the connector body is seated on the wellhead housing;

a threaded rod for each of the dogs, extending through a threaded hole in the connector body, and having an inner end and an outer end;

a plunger extending through a hole in the rod, and being axially movable relative thereto, the plunger having an inner end in contact with an outer side of one of the dogs, and an outer end being visible from the exterior of the connector body, to indicate whether or not the dog is in engagement with the wellhead housing grooves;

bias means for urging the plunger inwardly; and means for rotating the rod to move the rod inwardly into contact with the dog to push the dog into engagement with the wellhead housing grooves should the plunger indicate that the dog is not in full engagement with the wellhead housing grooves.

7. An apparatus for connecting a riser lowered from the surface to a wellhead housing of the type having a plurality of parallel grooves on its exterior, each groove having an upper flank that faces upward and outward relative to the axis of the wellhead housing, the apparatus comprising in combination:

a connector body adapted to be connected to the riser and lowered over the wellhead housing;

a plurality of dogs carried in the connector body, each having grooves on its interior for mating with the grooves on the wellhead housing;

guide means in the connector body of allowing the dogs to retract outward and upward and extend inward and downward in directions substantially perpendicular to the upper flanks of the wellhead housing grooves as the connector body is lowered over the wellhead housing and the grooves of the dogs contact and align with the grooves of the wellhead housing;

spring means for urging the dogs to extend, to lock the connector body to the wellhead housing when the grooves of the dogs are aligned with the grooves of the wellhead housing;

release means carried in the connector body for forcing the dogs outward from the wellhead grooves when the connector body is pulled upward;

locking means for selectively preventing the release means from operating;

a threaded rod for each of the dogs, extending through a threaded hole in the connector body, having an inner end and an outer end;

each of the dogs having an outer side with a vertical slot formed therein that extends to the upper edge of the dog;

a plunger extending through a hole in the rod and being axially movable relative thereto, the plunger having an inner end in contact with an outer side of one of the dogs, and an outer end that is visible from the exterior of the connector body, to indicate whether or not the dog is in full engagement with the wellhead housing grooves;

bias means for urging the plunger inwardly;

means for rotating the rod to move the rod into contact with the dog to push the dog into engagement with the grooves should the plunger indicate that the dog is not into full engagement with the wellhead housing grooves; and the plunger and rod extending through the slot in the dogs, enabling the connector body and the rod to be pulled upwardly when the release means is actuated, without first rotating the rods out of engagement with any of the dogs.

8. An apparatus for connecting a riser lowered from the surface to a wellhead housing of the type having a plurality of parallel grooves on its exterior, each groove having an upper flank that faces upward and outward relative to the axis of the wellhead housing, the apparatus comprising in combination a connector body adapted to be connected to the riser and lowered over the wellhead housing;

a plurality of dogs carried in the connector body, each having grooves on its interior for mating with the grooves on the wellhead housing;

spring means for urging the dogs inward relative to the connector body;

guide means in the connector body for allowing the dogs to retract outward and upward and extend inward and downward relative to the connector body only in directions substantially perpendicular to the upper flanks of the wellhead housing grooves, the spring means causing the dogs to slidingly engage the grooves of the wellhead housing as the connector body is lowered over the wellhead housing until the grooves of the dogs align with the grooves of the wellhead housing and the connector body is seated on the wellhead housing, the spring means then urging the dogs inward into locking engagement with the grooves of the wellhead housing;

the guide means preventing the dogs from moving outward from the grooves of the wellhead housing during the application of an upward force on the connector body;

release means carried in the connector body for applying an outwardly directed force to the dogs, forcing the dogs outward from the wellhead grooves when it is desired to pull the connector body upward.

* * * * *